June 19, 1956 — L. H. FLORA — 2,751,052
JOINT FOR ROOFING, WALL, FLOOR OR THE LIKE
Filed Sept. 2, 1953
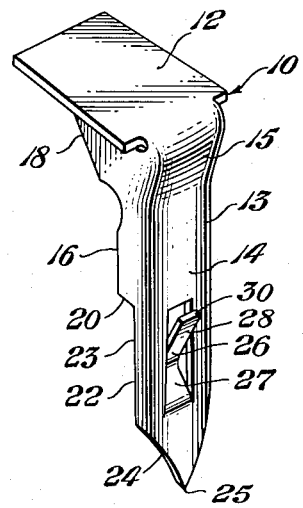
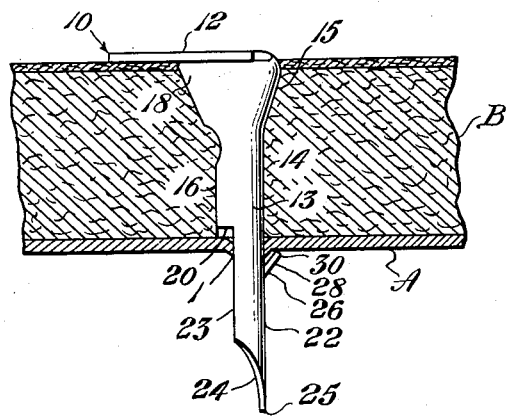
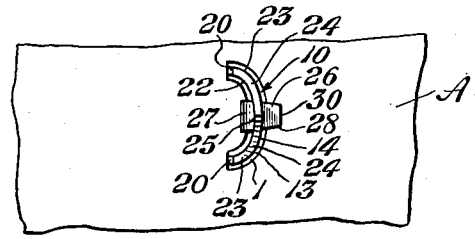
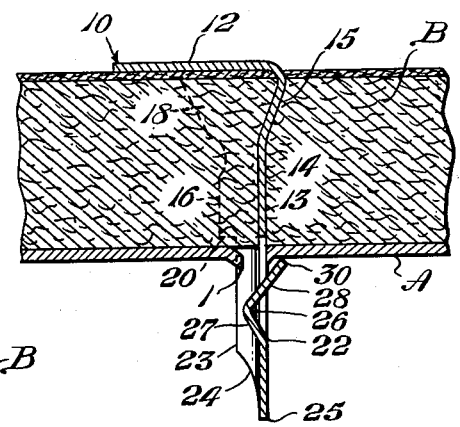
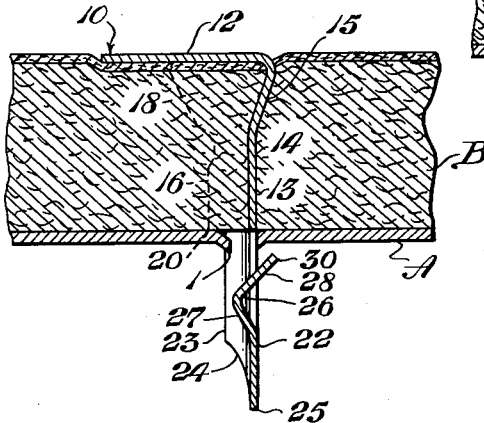
INVENTOR
Laurence H. Flora
BY
H. L. Lombard
ATTORNEY United States Patent Office 2,751,052
Patented June 19, 1956

2,751,052

JOINT FOR ROOFING, WALL, FLOOR OR THE LIKE

Laurence H. Flora, Cleveland, Ohio, assignor to Tinnerman Products, Inc., Cleveland, Ohio, a corporation of Ohio Application September 2, 1953, Serial No. 378,063

1 Claim. (Cl. 189—36)

This invention deals with an improved construction for a sheet metal nail for use in insulated roofing structures, and the like, in which the nail is driven into a thickness of sheet steel or other sheet metal included in the deck or wall of a structure to secure a pad or layer of insulation or similar material thereto. This application is a continuation in part of prior copending application Serial Number 310,841 filed September 22, 1952, now Patent No. 2,740,505.

Heretofore, the usual roofing nail intended to be driven into sheet metal deck or wall actually served as little more than a prong adapted to cut a passage in the sheet metal and be retained therein merely by frictional engagement with the marginal edge of the passage, and possibly slightly added resistance provided by roughened surfaces on the shank of the nail. Due to weather conditions, vibration, etc., it is well known that such roofing nails frequently work loose and often result in unsatisfactory installations.

A primary object of this invention is to provide an improved sheet metal roofing nail having a special construction for effecting an automatic positive lock in the sheet metal deck or wall in which it is driven such that the nail is permanently retained in tightened fastening position against loosening or displacement under the most severe service conditions.

In insulated roofing and wall constructions, the usual insulation is made in sizeable pads of material which is relatively soft and porous and somewhat compressible such that it is difficult to drive the roofing nails to the exact depth of their most effective fastening position, and consequently, there is frequently an unintended overdriving of the nails which results in a poor or faulty installation. Another object of the invention, therefore, is to provide a sheet metal roofing nail, or the like, having a special construction for preventing overdriving of the nail and for limiting the driving of the nail to the predetermined depth at which the nail is in its most effective fastening position in accordance with the thickness of the pad of insulation of other material, and further with the locking means on the nail effective at such predetermined depth to anchor the nail in its final fastening position.

A further object of the invention is to provide an improved sheet metal nail for roofing and similar purposes in which the nail has a generally channel-shaped lengthwise formation and the positive locking means thereon is provided as an integral locking tongue stamped in the sheet metal shank in a manner whereby the tongue is positioned within the channel-shaped formation of the nail to facilitate the passage of said tongue through a hole in a sheet metal deck in which the nail is driven, and with said locking tongue, otherwise, having its extremity projecting outwardly as a prounounced shoulder for engaging the underside of the sheet metal deck to anchor the nail in a positive lock in its final fastening position.

Another object of the invention is to provide a sheet metal nail, such as just described, in which the generally channel-shaped shank of the nail is cutaway along its sides to define abutments serving as stops which limit the driving of the nail to a predetermined depth and prevent overdriving of the nail, as and for the purposes aforesaid.

A further object of the invention is to provide an improved roofing nail, or the like, in accordance with the foregoing, in which the shoulder for locking the nail in applied position and the abutments for preventing overdriving of the nail are positioned at predetermined points on the shank of the nail and in cooperative relation to each other in a manner whereby said abutments are adapted to engage the forward side of the sheet metal deck when the nail is driven home at substantially the same time in which said shoulder clears the underside of said deck and is in position for positive locking engagement with the underside of said deck.

An additional object of the invention is to provide an improved sheet metal nail embodying the foregoing features and characteristics together with an improved head construction comprising an integral head portion which is supported and reinforced by an adjacent bulbous enlargement and extensions on the channel-shaped shank in a strong, durable and reliable one-piece article of manufacture which is admirably suited for economical quantity production at relatively low cost.

Further objects and advantages, and other new and useful features in the construction, arrangement and general combination of elements of the improved roofing nail of the invention will be readily apparent as the following description proceeds with reference to the accompanying drawings, for purposes of illustration but not of limitation, in which like reference characters designate like parts throughout, and in which:

Fig. 1 is a perspective view of the improved sheet metal roofing nail, or the like, in accordance with the invention;

Fig. 2 is a sectional view of a typical roofing installation in which a pad or layer of insulation is secured to a sheet steel deck, or the like, by the improved roofing nail of the invention, the nail being shown in side elevation as driven home and positively locked in final position;

Fig. 3 is a bottom plan view of Fig. 2 illustrating the reinforced curved contour of the shank of the roofing nail and shows the point and pilot portion of the nail as driven through the sheet steel deck with the extremity of the locking tongue in positive locking engagement with the underside of said deck;

Fig. 4 is a sectional view similar to Fig. 2 in which the nail is shown in section as driven home in the sheet steel deck and positively locked in fully applied position;

Fig. 5 is a view similar to Fig. 4 showing the roofing nail as driven to the depth of the abutments on the sides of the shank to pierce and cut a passage or hole in the sheet metal deck, with the extremity of the locking tongue clearing the underside of the sheet steel deck just prior to movement of the nail to its final fastening position shown in Fig. 4.

Referring now, more particularly, to the drawings, Fig. 2 shows a typical roofing insulation in which a layer or pad of insulation B is secured to a sheet metal or sheet steel deck A forming the primary support or base of a roof or wall. The sheet metal or sheet steel deck A defines a panel-like surface on which the layer of insulation B in the form of pads or padding, or the like, is secured by the improved roofing nails of the invention driven through said insulation and through the sheet metal or steel deck A to positively locked fastening position substantially as shown in Figs. 2 and 4.

The sheet metal roofing nail, designated generally 10, is advantageously provided in a relatively simple construction adapted for economical quantity production at relatively low cost. The roofing nail preferably is provided from spring steel or cold rolled steel having spring characteristics and the gauge of which is selected according to service requirements and the predetermined thickness of the parts to be secured. The sheet metal roofing nail is most effective when provided of spring steel suitably heat treated to provide the desired toughness and hardness, and is readily constructed from a relatively small inexpensive strip of such spring steel which may be readily obtained from standard strip stock with little loss or waste of material. The sheet metal blank provided by such a strip of spring steel has a flat portion 12 at one end defining the head of the nail which extends substantially at right angles to a generally channel-shaped shank 13 formed from the remainder of the blank. The generally channel-shaped shank 13 includes a central longitudinal wall 14 between a pair of longitudinally extending ribs or flanges 16 carrying angularly-shaped lateral extensions 18 extending under the head portion 12. The central wall 14 of the shank is of less width than the width of the head portion 12 and has an outward flare 15 adjacent thereto defining an enlarged bulbous formation which provides for increased strength in this area of the nail adjacent said head portion 12.

The angularly-shaped lateral extensions 18 at the upper ends of the longitudinal ribs 16, engage the underside of said head portion 12 and serve as a reinforcing means acting in conjunction with the flared portion 15 to support and bolster said head 12 in the driving of the nail. As illustrated in Fig. 2, when the head 12 of the nail is driven flush with the insulation B in the applied position of the nail, the lateral extensions 18 are adapted to embed in said insulation B and thereby resist displacement of the upper end of the nail from its applied position.

The shank 13 of the roofing nail comprises a free end of the strip and therefore, may be provided in any necessary length depending on the length of the shank desired in the completed roofing nail. The elongate ribs 16 serve to stiffen and rigidify the shank of the nail in the manner of a channel shape and the central wall 14 of the shank is curved, as seen in Fig. 3, to provide the shank in a corrugation which adds further to the stiffness and rigidity of the shank. The lower ends of the longitudinal ribs 16 are cutaway to define a pair of abutments 20 at a predetermined spacing from the head 12 of the nail slightly less than the approximate thickness of the layer of insulation B, and below said abutments 20, the generally channel-shaped shank portion 22 includes the ribs 23 of reduced width in a pilot portion on the leading end of the nail. The entering end of said generally channel-shaped pilot 22 preferably is formed with a V-shaped, wedge type of point having sharp cutting edges 24 leading to said ribs 23 and diverging from a sharp piercing point 25 adapted to puncture readily the sheet metal deck or wall A.

A positive locking shoulder 30 is provided on the shank of the roofing nail in a predetermined spacing from the head portion 12 corresponding substantially to or slightly less than the known combined thickness of the sheet metal deck A and the layer of insulation B. The shoulder 30 is provided by a partially severed portion formed by an inverted U-shaped or generally V-shaped slit in the central wall 14 of the shank, Fig. 1, defining an integral tongue 26 having a free end extending toward the head 12 of the nail. Said tongue 26 is bent to extend within the channel of the generally channel-shaped pilot portion 22 between the ribs 23, and comprises a guide surface 27 inclined outwardly and upwardly from adjacent the junction of said tongue 26 with the central wall 14 of the shank and merging with a free end portion 28 inclined upwardly and inwardly toward said central wall 14, with the extremity 30 thereof extending through the cutout from which said tongue 26 is formed and presenting said pronounced locking shoulder 30 projecting beyond the opposite side of said central wall 14 of the shank.

The positive locking shoulder 30 thus provided by the free end of the tongue 26 is such that when the nail is driven home, said shoulder 30 is adapted to snap past the adjacent edge of the hole or passage 1 pierced and cut by the nail in the sheet metal deck A, and to spring outwardly into positive engagement with the adjacent marginal edge portion of said hole or passage 1 at the underside of said sheet metal deck A; and, as presently to be described, this action is facilitated by the construction and arrangement whereby the major portion of said tongue 26 is positioned within the channel of the channel-shaped pilot portion 22 between the ribs 23.

The arrangement, otherwise, is such that when the nail is driven home, the locking shoulder 30 is automatically seated in positive locking engagement with the sheet steel deck A, as aforesaid, with the head 12 substantially flush with the outer surface of the insulation B as necessary for the application of overlying shingles or finishing materials, etc. To this end, the abutments 20, are so provided as to prevent overdriving of the nail in a manner whereby said abutments 20 serve as stops which engage the forward side of the sheet metal deck A, as shown in Fig. 5, to limit further driving of the nail when the head portion 12 is substantially flush with the outer surface of the insulation B and the locking shoulder 30 has cleared the hole or passage 1 in the deck A and is in position for positive locking engagement with the underside of said deck A. In this way, overdriving of the nails which would result in a faulty installation is prevented such that the nails are adapted to be applied easily and quickly at high speed without need for special precautions as they are driven home.

It will be understood from the foregoing, that the shoulder 30 on the end of tongue 26 and the abutments 20 are provided at predetermined points on the shank of the nail and in cooperative relation to each other in a manner whereby said abutments 20 are adapted to engage the forward side of the deck A when the nail is driven home at substantially the same time in which said shoulder 30 clears the underside of said deck A and is in position for positive locking engagement with the underside of said deck A, substantially as shown in Fig. 5.

The completed roofing nail 10, thus provided, is applied in the usual manner in driving the same by hammer blows on the head 12 of the fastener. In this regard, when the leading end of the nail is driven through the insulation B, the insulation serves to steady the nail such that the sharp point 25 of the nail readily pierces the sheet metal deck A in a quick and expeditious manner. Upon continued driving of the nail, the sharp cutting edges 24 of the V-shaped pilot easily cut the hole or passage 1 in the sheet metal deck A, Fig. 5, as necessary to pass the adjoining channel-shaped pilot portion 22 leading to the area of the tongue 26 positioned with said channel-shaped pilot 22. The cutting edges 24 are followed by the wider spaced ribs 23 of the channel-shaped pilot portion 22 which enlarge the hole 1 as necessary to pass that portion of the tongue 26 positioned within said channel-shaped pilot 22. The cutting action of the ribs or flanges 23 on the channel-shaped pilot 22 is such that they countersink the marginal portions of the hole 1 and thereby enlarge said hole to a size adapted to pass said tongue 26 with little obstruction while the free end of said tongue 26 defining the shoulder 30 readily snaps past the adjacent edge of said hole 1. Inasmuch as the roofing nail 10 is constructed of relatively thick gauge metal, the tongue 26 and shoulder 30 on the extremity thereof retain their original shape as said tongue forces its way through the hole in a manner whereby the guide surface 27 of said tongue rides over the adjacent edge of the hole 1 in a camming action until it passes through said hole, whereupon the free end 28 of the tongue slides over the edge of the hole adjacent thereto to the position shown in Fig. 5 where said shoulder 30 on the extremity of said tongue 26 clears the underside of the sheet metal deck A.

At this point, the abutments 20 on the shank of the nail engage the forward side of said deck A to serve as stops limiting further penetration of the nail and preventing overdriving of the nail, as aforesaid. In this relation, the head portion 12 of the nail slightly compresses the adjacent outer surface of the layer of insulation B while the shoulder 30 on the extremity of the tongue 26 is slightly spaced from the underside of the sheet metal deck A and overlaps a material marginal edge portion of the hole 1 in positive abutting relation therewith.

When the nail 10 is thus driven to its limit of penetration, the layer of insulation B is free to expand from its compressed condition under the head portion 12 of the nail as shown in Fig. 5, to its normal condition illustrated in Fig. 4, thereby causing a slight reverse axial movement of the nail which draws the shoulder 30 into tensioned engagement with the underside of the sheet metal deck in positive locking relation therewith substantially as shown in Figs. 2 and 4. The fastening action is such that roofing nails in accordance with the invention are readily applied with an automatic positive locking action in final position in practically every instance, and in a manner whereby they are permanently retained in their initial tightened relation with little danger of loosening or displacement under the most severe service conditions.

While the invention has been described in detail with a specific example, such example is intended as an illustration only inasmuch as the invention fully contemplates various modifications which may be provided without departing from the spirit and scope of the invention.

What is claimed is:

A joint comprising a sheet metal supporting part, a layer of compressible material thereon, and a sheet metal nail in predetermined penetrated position in said sheet metal supporting part comprising an elongate piece of sheet metal having a transverse bend providing a lateral head and a substantially channel-shaped shank extending in generally normal relation to said head and having a V-shaped lower end comprising cutting edges diverging from a point, said sheet metal supporting part having a passage pierced and cut therein by said point and lower end and said substantially channel-shaped shank extending through said layer of material and through said passage in said sheet metal supporting part, said substantially channel-shaped shank being curved transversely substantially in the form of a longitudinal corrugation comprising a longitudinal wall having substantially concave and convex surfaces with the longitudinal edge portions of said shank defining longitudinal ribs reinforcing said shank, said longitudinal ribs comprising upper rib portions and lower rib portions of reduced width defining abutments at the junctions of said upper and lower rib portions, the upper edges of said upper rib portions being in contact with the undersurface of said head and said abutments engaging said sheet metal supporting part at said predetermined penetrated position of the nail therein, said longitudinal wall having an intermediate partially severed area provided by an inverted substantially U-shaped slit defining an opening in said longitudinal wall and providing a tongue in said opening having a junction with said longitudinal wall, said tongue comprising a lower guide portion extending from said junction angularly inwardly within said channel-shaped shank and merging with the free end portion of said tongue extending angularly backwardly from said guide portion through said opening in said longitudinal wall with the extremity of said tongue defining a shoulder projecting from the convex surface of said longitudinal wall, said passage in the sheet metal supporting part being countersunk and enlarged along the concave surface of said channel shaped shank by the penetration of said lower rib portions into said sheet metal supporting part, whereby said tongue passes through said enlarged passage such that there is substantially no deformation of said tongue or displacement of the shoulder defined by the extremity of said tongue, said shoulder defined by the extremity of said tongue being spaced from said head of the nail a distance slightly less than the combined thickness of said sheet metal part and said layer of compressible material thereon, such that in said predetermined penetrated position of the nail, said layer of compressible material is compressed by the head of the nail with said shoulder defined by the extremity of said tongue extending through said passage in the sheet metal part in overlapping relation to the adjacent marginal edge of said passage at the underside of said sheet metal part, said compressed material being in expanded normal condition in the completed joint and providing a reverse axial pull on said shank maintaining said shoulder in positive engagement with said underside of said sheet metal part in locked relation therewith.

References Cited in the file of this patent

UNITED STATES PATENTS

| 321,864 | Taylor | July 7, 1885 |
| 634,413 | Higgins | Oct. 3, 1899 |
| 727,111 | Duffy | May 5, 1903 |
| 1,119,686 | Davis | Dec. 1, 1914 |
| 2,073,037 | Weber | Mar. 9, 1937 |
| 2,155,893 | Fulton | Apr. 25, 1939 |
| 2,319,058 | Hansman | May 11, 1943 |
| 2,327,519 | Groothedde | Aug. 24, 1943 |
| 2,374,740 | Gadow | May 1, 1945 |

OTHER REFERENCES

American Roofer Magazine, vol. 2, No. 5, August 1948, page 6.